(12) United States Patent
Koizumi et al.

(10) Patent No.: US 8,261,529 B2
(45) Date of Patent: Sep. 11, 2012

(54) GAS TURBINE COMBUSTOR AND GASEOUS FUEL SUPPLY METHOD FOR GAS TURBINE COMBUSTOR

(75) Inventors: Hiromi Koizumi, Hitachi (JP); Tomohiro Asai, Namegata (JP); Hiroshi Inoue, Mito (JP); Tsunemasa Nishijima, Hitachi (JP); Hidetaro Murata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 838 days.

(21) Appl. No.: 12/370,236

(22) Filed: Feb. 12, 2009

(65) Prior Publication Data
US 2009/0223226 A1    Sep. 10, 2009

(30) Foreign Application Priority Data
Mar. 5, 2008 (JP) .................... 2008-054230

(51) Int. Cl.
*F02C 3/20* (2006.01)
(52) U.S. Cl. .................. 60/39.463; 60/39.465; 60/752; 60/746
(58) Field of Classification Search ............ 60/39.463, 60/39.465, 39.12, 776, 778, 780, 752, 746, 60/747, 733
See application file for complete search history.

(56) References Cited

U.S. PATENT DOCUMENTS

| | | | | |
|---|---|---|---|---|
| 4,025,282 A | * | 5/1977 | Reed et al. .................... | 431/11 |
| 4,039,804 A | * | 8/1977 | Reed et al. .................... | 700/287 |
| 4,369,803 A | * | 1/1983 | Furr ............................ | 137/6 |
| 4,603,548 A | * | 8/1986 | Ishibashi et al. .............. | 60/773 |
| 4,716,719 A | * | 1/1988 | Takahashi et al. ............. | 60/773 |
| 4,761,948 A | | 8/1988 | Sood et al. | |
| 6,145,297 A | * | 11/2000 | Nagafuchi et al. ......... | 60/39.281 |
| 6,199,366 B1 | | 3/2001 | Murata et al. | |
| 6,250,065 B1 | * | 6/2001 | Mandai et al. ................. | 60/776 |
| 6,385,960 B1 | * | 5/2002 | Kress et al. ................... | 60/778 |
| 6,385,975 B1 | * | 5/2002 | Nakamoto ..................... | 60/734 |
| 6,490,867 B2 | * | 12/2002 | Braun et al. ................... | 60/776 |
| 7,464,555 B2 | * | 12/2008 | Bachovchin et al. .......... | 60/777 |
| 7,549,293 B2 | * | 6/2009 | Gallagher et al. ............ | 60/773 |
| 7,596,939 B2 | * | 10/2009 | Kataoka et al. ............ | 60/39.281 |
| 7,610,746 B2 | * | 11/2009 | Fujii et al. ................. | 60/39.281 |
| 7,644,574 B2 | * | 1/2010 | Feiz ........................... | 60/39.281 |
| 7,921,651 B2 | * | 4/2011 | Alexander et al. ............ | 60/776 |
| 2003/0056517 A1 | * | 3/2003 | Brushwood et al. .......... | 60/776 |
| 2007/0022733 A1 | * | 2/2007 | Sako et al. ................. | 60/39.12 |
| 2008/0289341 A1 | | 11/2008 | Ishizaka et al. | |
| 2009/0272118 A1 | * | 11/2009 | Alexander et al. ............ | 60/772 |

FOREIGN PATENT DOCUMENTS

| | | |
|---|---|---|
| JP | 62-218628 A | 9/1987 |
| JP | 62-180217 U | 11/1987 |
| JP | 04-086335 A | 3/1992 |
| JP | 7-224688 A | 8/1995 |
| JP | 08-312377 A | 11/1996 |
| JP | 11-210495 A | 8/1999 |
| JP | 2003-148734 | 5/2003 |
| JP | 2003-328779 A | 11/2003 |
| JP | 2006-161603 | 6/2006 |
| JP | 2006-336995 A | 12/2006 |

\* cited by examiner

*Primary Examiner* — William H Rodriguez
(74) *Attorney, Agent, or Firm* — Mattingly & Malur, PC

(57) ABSTRACT

A combustor includes two upstream parts of fuel supply system supplying gaseous fuels of two types having different heating values from each other, a three-way fuel transfer valve merging the two upstream parts of fuel supply system with each other, a plurality of gaseous fuel supply subsystems supplying a combustion chamber with the gaseous fuels supplied through the three-way fuel transfer valve and branched, and a plurality of burners injecting, corresponding to each of the gaseous fuel supply subsystems, the gaseous fuel supplied from the gaseous fuel supply subsystem into the combustion chamber.

3 Claims, 6 Drawing Sheets

GAS TURBINE COMBUSTOR AND GASEOUS FUEL SUPPLY METHOD FOR GAS TURBINE COMBUSTOR

BACKGROUND OF THE INVENTION

1. Field of the Invention

The present invention relates to a gas turbine combustor and a gaseous fuel supply method for the gas turbine combustor.

2. Description of Related Art

JP-A-2006-161603 discloses a gas turbine apparatus having a compact structure capable of utilizing flammable gas at low cost by stably burning low Btu gas. JP-A-2006-161603 does not, however, disclose a relationship between a three-way fuel transfer valve that allows high Btu gas to merge with low Btu gas and a burner disposed downstream of the three-way fuel transfer valve.

SUMMARY OF THE INVENTION

To supply a combustor with the low Btu gas having a lower heating value than LNG, it is necessary to increase the fuel flow rate in proportion to reduction in the heating value.

In JP-A-2006-161603, if there is a single fuel supply system between the three-way fuel transfer valve and the burner, supplying a fuel nozzle based on the LNG with the low Btu gas results in an increased fuel flow rate, which results in an increased pressure loss of the fuel nozzle. This calls for changes in specifications of the gas compressor pressure, the control valve or other parts, or gaseous fuel piping, leading to a significant increase in cost. If the specifications (gas fuel hole area) of the fuel nozzle are established based on maximum flow rate conditions of the low Btu gas, on the other hand, the fuel nozzle undergoes an extremely low pressure loss under the condition of a small flow rate of LNG. This produces deviation in the fuel flow, inducing unstable combustion or other problem.

It is an object of the present invention to inhibit a significant increase in cost and unstable combustion resulting due to use of two different types of fuel.

To achieve the foregoing object, an aspect of the present invention provides a combustor that includes: two upstream parts of fuel supply system supplying gaseous fuels of two types having different heating values from each other; a three-way fuel transfer valve merging the two upstream parts of fuel supply system with each other; a plurality of gaseous fuel supply subsystems supplying a combustion chamber with the gaseous fuels supplied through the three-way fuel transfer valve and branched; and a plurality of burners injecting, corresponding to each of the gaseous fuel supply subsystems, the gaseous fuel supplied from the gaseous fuel supply subsystem into the combustion chamber.

In accordance with the aspect of the present invention, use of the two types of gaseous fuels inhibits a significant increase in cost and unstable combustion.

BRIEF DESCRIPTION OF THE DRAWINGS

The present invention will be described hereinafter with reference to the accompanying drawings.

DESCRIPTION OF THE PREFERRED EMBODIMENTS

Studies are lately underway on possible use of a large variety of fuel for gas turbines. One study examines the possible use of mixed gas fuel containing multiple components such as hydrogen and carbon monoxide (for example, off gas generated in refineries and coke oven gas generated during steel production processes) as the main fuel for the gas turbine, in addition to the liquefied natural gas (LNG) that is the main fuel of the gas turbine. The mixed gas fuel is a by-product fuel and thus costs low, offering an advantage of reduced running cost of fuel if the fuel can be used for the gas turbine fuel. Moreover, the mixed gas fuel contains hydrogen and, as a result, contains a low carbon content. This could lead to an effect of reduced $CO_2$ in exhaust gases as compared with the LNG.

Flame temperature resulting from the hydrogen and carbon monoxide contained in such a by-product fuel is, however, higher than that of the LNG. The hydrogen, in particular, has a wide flammability range, a fast burning velocity (easily flammable), and a stronger possibility of explosion. If the hydrogen is to be used as the gas turbine fuel, therefore, common practice is to use an auxiliary fuel for start-up.

To supply the gas turbine with the high Btu gas (LNG) and the low Btu gas (gas having a lower heating value than the LNG), it is necessary to increase the fuel flow rate in proportion to the reduction in the heating value. JP-A-2006-161603 does not, however, disclose the relationship between the three-way fuel transfer valve that allows high Btu gas to merge with low Btu gas and the burner disposed downstream of the three-way fuel transfer valve. The art disclosed in JP-A-2006-161603 is therefore unable to respond to the increase in the fuel flow rate using bi-gaseous fuel system.

[First Embodiment]

Figure 1:
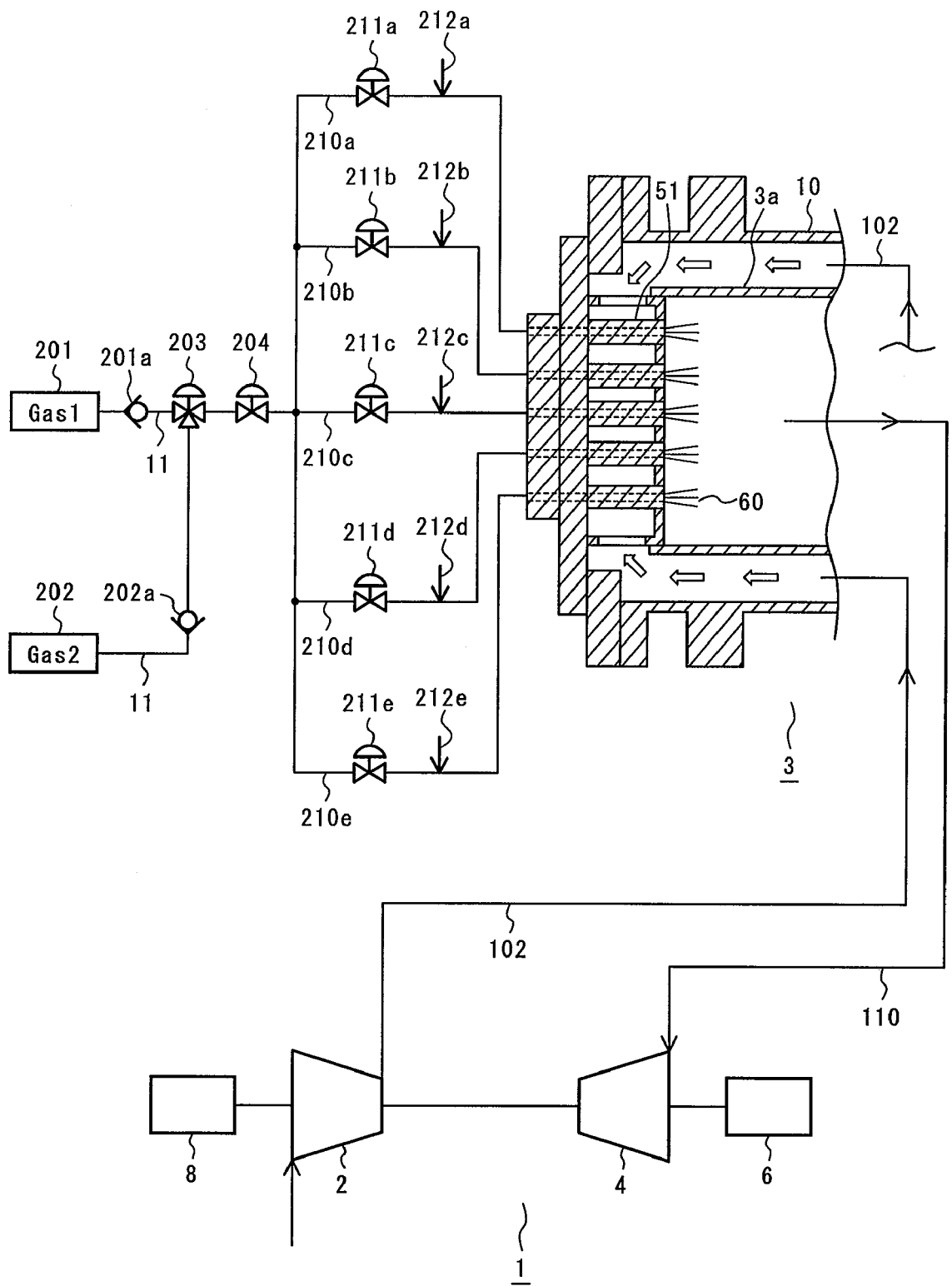
FIG. 1 is a schematic system diagram of a power plant according to a first embodiment of the present invention.

FIG. 1 is a schematic system diagram of a gas turbine power plant according to a first embodiment of the present invention. A gas turbine 1 typically includes an air compressor 2, a combustor 3, a turbine 4, a generator 6, and a start-up motor 8 for driving the gas turbine.

A plurality of burners 51 for injecting and mixing fuel and air and performing low NOx combustion is disposed at a head portion of the combustor 3. Combustion air 102 supplied to the combustor 3 is compressor discharge air compressed by the air compressor 2. The combustion air 102 flows through a space defined by a cylindrical liner 3a that forms a combustion chamber and an outer casing 10 that forms a pressure vessel. The combustion air 102 thereby cools a surface of the liner 3a and is distributed into cooling air for the liner 3a and combustion air for the burners 51.

The combustor 3 includes upstream parts of fuel supply system 11 supplying LNG 201 and off gas 202 which contains hydrogen and has a lower heating value than the LNG 201. In the first embodiment of the present invention, the LNG 201 is the high Btu gas and the off gas 202 is the low Btu gas. A three-way transfer valve (selector valve) 203 is disposed downstream of the two upstream parts of fuel supply system 11. The three-way transfer valve 203 permits selection between the LNG 201 and the off gas 202 containing hydrogen. Either one of the gaseous fuel can be supplied by varying a valve stroke of the three-way transfer valve 203. The upstream parts of fuel supply system 11 include check valves 201a, 202a, respectively. The check valves 201a, 202a prevent gas of a different type from flowing back into the corresponding one of the upstream parts of fuel supply system 11.

A single fuel system is disposed downstream of the three-way transfer valve 203. The fuel system includes a single gaseous fuel pressure regulation valve 204 disposed therein. The gaseous fuel pressure regulation valve 204 regulates pressure on an upstream side of gaseous fuel flow control valves 211. An opening of the gaseous fuel pressure regulation valve 204 is adjusted to an appropriate value in accordance with a change in the gaseous fuel flow rate. The arrangement, in which the three-way transfer valve 203 is disposed upstream of the gaseous fuel pressure regulation valve 204, allows the single gaseous fuel pressure regulation valve 204 to be adapted to both types of gaseous fuel.

The fuel system in which the gaseous fuel pressure regulation valve 204 is disposed is branched on a downstream side thereof into gaseous fuel supply subsystems 210, each corresponding to a corresponding one of the burners 51. The fuel flow rate supplied to the burners 51 can be adjusted with the gaseous fuel flow control valves 211 disposed in the gaseous fuel supply subsystems 210. The gas turbine power plant system shown in FIG. 1 includes five subsystems of gaseous fuel supply subsystems 210a to 210e supplying fuel to respective ones of the burners 51. Each of the gaseous fuel supply subsystems 210a to 210e includes a corresponding one of gaseous fuel flow control valves 211a to 211e and a corresponding one of purge subsystems 212a to 212e.

Operations of the gas turbine power plant according to the first embodiment of the present invention will be described below. At start-up, the gas turbine 1 is driven by the start-up motor 8 or other external power drive. In the combustor 3, the combustion air 102 of the air compressor 2 and the LNG 201 as start-up gaseous fuel are used and the LNG 201 supplied from the gaseous fuel supply subsystem 210a for a pilot burner to the burner 51 is ignited. Combustion gas 110 is thereafter supplied to the turbine 4 and the turbine 4 accelerates as the flow rate of the LNG 201 increases. The gas turbine 1 enters an autonomous operation mode to reach a no-load full speed when the start-up motor 8 is disconnected. After the gas turbine 1 has reached the no-load rated speed, the generator 6 is put into parallel operation; further, as the fuel flow rate in the gaseous fuel supply subsystem 210a leading to the pilot burner increases, an inlet gas temperature of the turbine 4 increases and load increases. Thereafter, the fuel flow rates from gaseous fuel supply subsystems 210b to 210e are sequentially varied to predetermined flow rate conditions using the gaseous fuel flow control valves 211b to 211e. This forms flame in each of all burners 51, enabling continuous load operation in an operable load range through combustion of all burners 51.

The change of fuel between the LNG 201 and the off gas 202 containing hydrogen, and load operations of the off gas 202 according to the first embodiment of the present invention will be described below. It is herein assumed that the gaseous fuels are changed at a point near 50% load of the gas turbine 1. It is further assumed that the off gas 202 is the coke oven gas generated at refineries, having a heating value per unit mass lower by about 30% than that of the LNG 201.

The combustor 3 is ignited and started by supplying the burners 51 with the LNG 201. As the fuel flow rate thereafter increases, the turbine 4 accelerates and the no-load full speed of the gas turbine 1 is reached. After the no-load full speed is reached, the fuel flow rate is sequentially adjusted using the gaseous fuel flow control valves 211a, 211b, 211c disposed in the gaseous fuel supply subsystems 210a, 210b, 210c. This results in a partial load condition of the gas turbine 1 being reached. After the partial load condition is reached, the current valve stroke in the three-way transfer valve 203 (fully opened LNG system and fully closed off gas system) is gradually varied so as to achieve the valve stroke in the reverse way. This allows the off gas to be supplied to the gaseous fuel supply subsystems 210a to 210c. Note herein that the LNG 201 flows through the gaseous fuel supply subsystems 210a to 210c; even if the fuel type is changed to the off gas 202, the off gas 202 does not coexist with oxygen in the fuel piping, requiring no purge using, for example, nitrogen. The piping downstream of the gaseous fuel flow control valves 211d, 211e is, however, filled with air. After the adjustment of the valve stroke of the three-way transfer valve 203 is completed and the fuel type is changed from the LNG 201 to the off gas 202, therefore, it becomes necessary to supply nitrogen from the purge subsystem 212d to purge the piping in order to supply the gaseous fuel supply subsystem 210d with fuel. The change of fuel type is completed by supplying the gaseous fuel supply subsystem 210d with the off gas 202 after the purging by the purge subsystem 212d. In addition, if load increases with the increased fuel flow rate, the off gas 202 is supplied to the gaseous fuel supply subsystem 210e. In this case, too, purging with, for example, nitrogen is necessary in the same manner as with the gaseous fuel supply subsystem 210d. By supplying the gaseous fuel supply subsystem 210e with fuel, flames are formed in all burners 51 disposed in the combustor 3, enabling continuous load operation with the off gas 202 through all burner combustion.

Figure 2A:
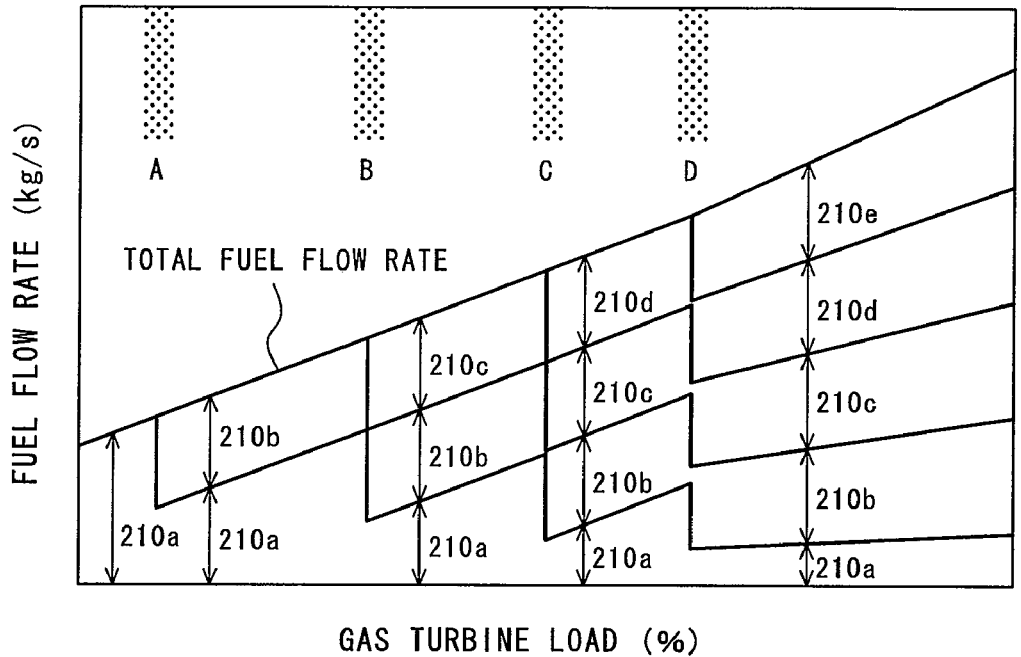
FIGS. 2A and 2B show changes in the flow rate of LNG and off gas under changing gas turbine loads according to the first embodiment of the present invention.
Figure 2B:
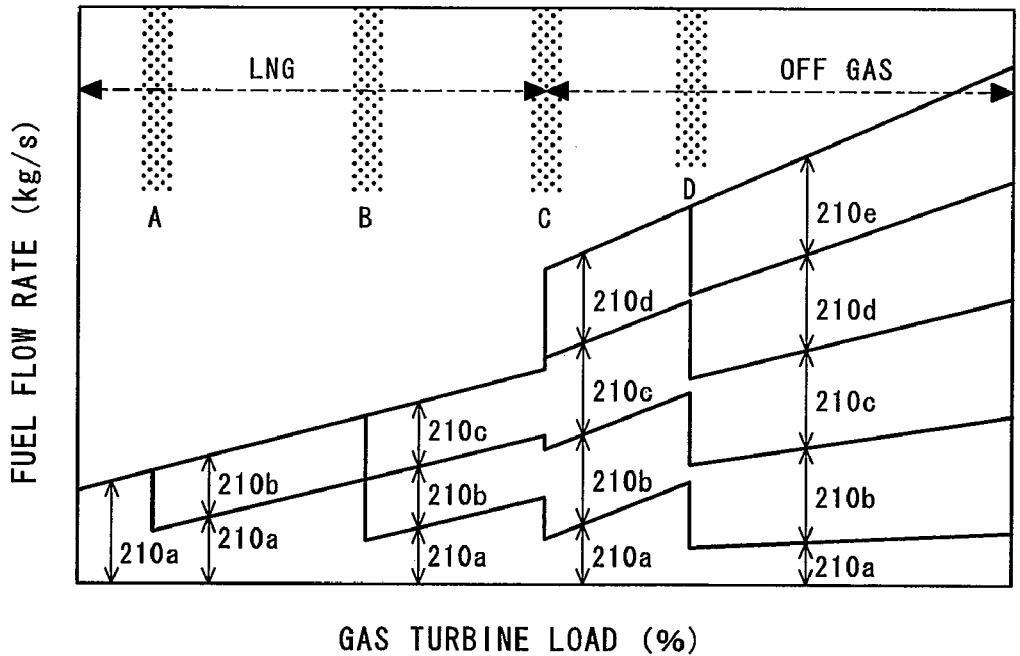

FIGS. 2A and 2B show changes in the flow rate of each fuel under changing gas turbine loads. FIG. 2A shows changes in the fuel flow rate in each subsystem from 0% load to full load using only the LNG. In FIG. 2A, the abscissa represents gas turbine load and the ordinate represents fuel flow rate. The gas turbine load increases as the total fuel flow rate increases and the fuel flow rate reaches its maximum under the full load condition. The fuel flow rate of each subsystem in the gaseous fuel supply subsystems 210a to 210e is varied according to the load condition so as to change the number of burners to be burned (loads A to D in FIG. 2A). This enables operations from the no-load full speed to full load. Low NOx combustion under high load conditions is enabled by all burner combustion, in which fuel is supplied to all gaseous fuel supply subsystems 210a to 210e.

FIG. 2B shows changes in the fuel flow rate when the gas turbine is operated with the LNG from ignition and start-up to the partial load condition and the fuel type is thereafter changed from the LNG to the off gas using the three-way transfer valve. Conditions of gas turbine loads A and C are operated with the LNG and the fuel type is changed from the LNG to the off gas under the condition of gas turbine load C.

The off gas has a lower heating value than the LNG. To gain the gas turbine output with the off gas equivalent to that achieved by the LNG, it is necessary to increase the supply fuel flow rate to compensate for the reduced heating value. Specifically, after the fuel type is changed from the LNG to the off gas, there is an increase in the fuel flow rate as compared with the LNG even under the same load condition. When the pressure loss of the fuel nozzle exceeds a permissible value as a result of the increased fuel flow rate, it becomes difficult to supply a required flow rate of the off gas with the same pressure as that applied to the LNG, thus necessitating an increase in the supply pressure. The increased supply pressure calls for changes in specifications of the gas compressor pressure, the control valve or other parts, or fuel piping, leading to a significant increase in cost, as compared with the LNG. Conversely, if the specifications (gas fuel hole area) of the fuel nozzle of the burner are made to comply with the flow rate of the off gas, the pressure loss of the fuel nozzle becomes excessively small under a small flow rate condition for supplying the LNG. Unstable combustion is likely to occur due to deviation of the flow rate. The pressure loss of the fuel nozzle [fuel pressure ratio: (fuel nozzle inlet gas pressure)/(combustor pressure)] should therefore be made to fall within an appropriate range. Special care should be used, in particular, to the gaseous fuel supply subsystem 210a (pilot burner subsystem) that is operated for the period from ignition of the gas turbine to the full load, because the gaseous fuel supply subsystem 210a has a wide range of fuel flow rate changes. In accordance with the first embodiment of the present invention, therefore, the change of fuel type between the LNG and the off gas is made under the condition of gas turbine load C.

As described above, if the difference in heating value between two types of fuel is 30% or less, low NOx combustion is possible with the fuels of both the LNG and the off gas under load conditions higher than the condition of gas turbine load C. For a greater difference in the heating value or to reduce the current fuel pressure ratio of the fuel nozzle, the following method is possible.

[Second Embodiment]

Figure 3:
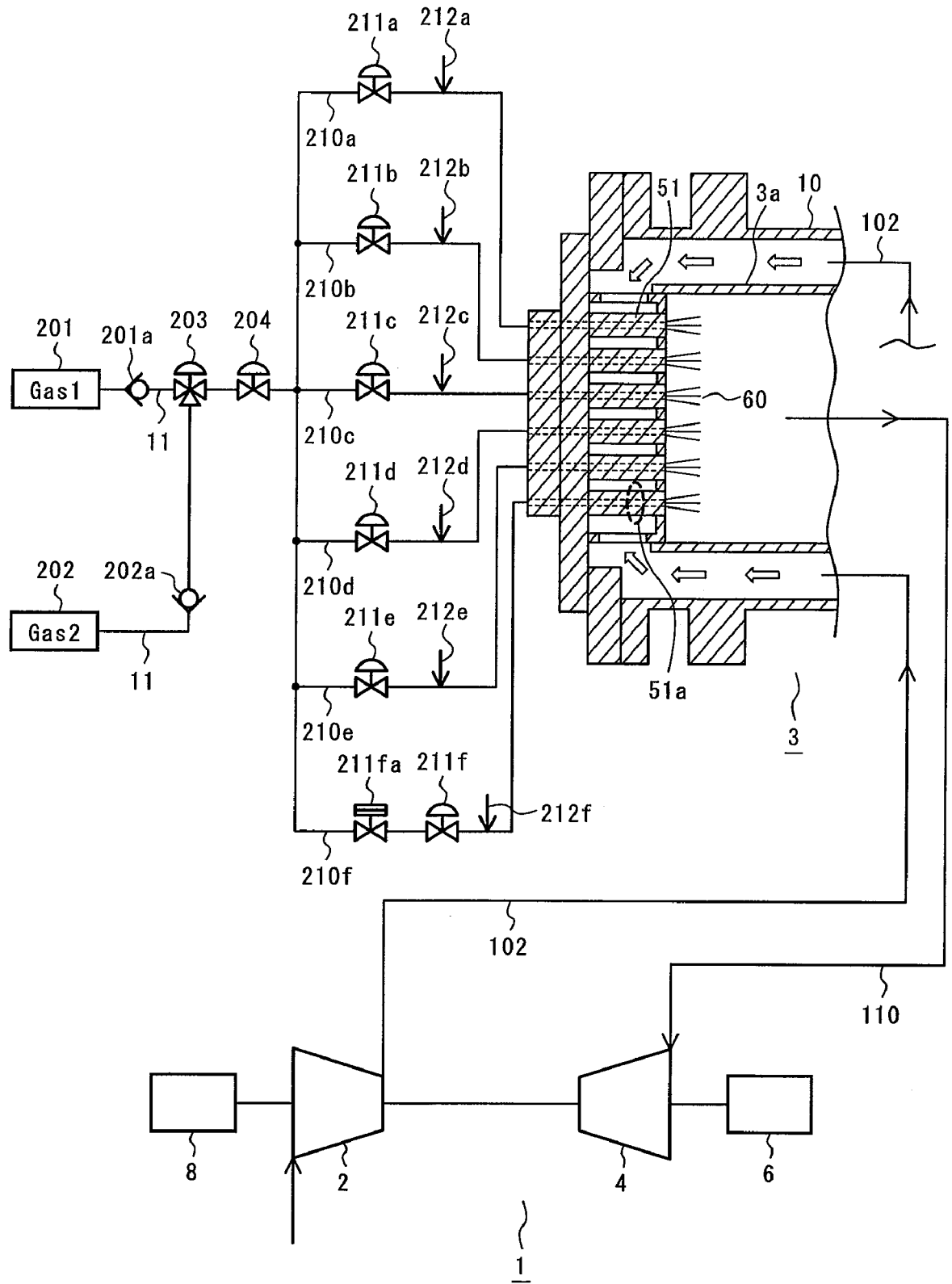
FIG. 3 is a schematic system diagram of a power plant according to a second embodiment of the present invention.

FIG. 3 is a schematic system diagram of a gas turbine power plant according to a second embodiment of the present invention. In the second embodiment of the present invention, a gaseous fuel supply subsystem 210a and an off gas-exclusive subsystem 210f are employed to form a gaseous fuel supply subsystem for a pilot burner. The off gas-exclusive subsystem 210f is dedicated only to the off gas and leads to a burner 51a that is dedicated to the off gas and disposed in a combustor. The off gas-exclusive subsystem 210f includes a gaseous fuel flow control valve 211f and an on-off valve 211fa disposed therein. The on-off valve 211fa disposed upstream of the gaseous fuel flow control valve 211f prevents fuel leak. The gaseous fuel flow control valve 211f and the on-off valve 211fa are connected downstream to a gaseous fuel pressure regulation valve 204 to be shared therebetween. In addition, a purge subsystem 212f for supplying the fuel piping with purging nitrogen is connected downstream of the gaseous fuel flow control valve 211f.

In single fuel combustion of LNG, operations of up to full load can be performed by adjusting the fuel flow rate of gaseous fuel supply subsystems 210a to 210e according to load. Operations involved in changing the fuel type from an LNG 201 to an off gas 202 are basically the same as those in the first embodiment of the present invention. In the second embodiment of the present invention, the off gas 202 is supplied to the gaseous fuel supply subsystems 210a, 210b, 210c by adjusting the valve stroke of a three-way transfer valve 203 at a point near 50% load of a gas turbine 1, as will be described later with reference to FIG. 4B. At this time, the fuel piping downstream of gaseous fuel flow control valves of the gaseous fuel supply subsystems 210d, 210e and the off gas-exclusive subsystem 210f is filled with air. As a result, purging the piping with a purge subsystem is necessary before the off gas 202 containing nitrogen is to be supplied. In the off gas-exclusive subsystem 210f, the off gas is supplied at point near 50% load of the gas turbine. After the purging of the piping is completed, the on-off valve 211fa of the off gas-exclusive subsystem 210f is opened and the gaseous fuel flow control valve 211f is gradually opened, so that the off gas can now be supplied. Arranging the off gas-exclusive subsystem 210f in parallel with the five gaseous fuel supply subsystems 210a to 210e permits operations without involving an increased pressure loss of the fuel nozzle when the off gas is supplied. In addition, during the single fuel combustion of the LNG, the off gas-exclusive subsystem 210f is not to be used. This permits operations without involving the increased pressure loss of the fuel nozzle. Note that the on-off valve 211fa of the off gas-exclusive subsystem 210f prevents the LNG from leaking to the off gas-exclusive subsystem 210f during the single fuel combustion of the LNG.

Figure 4A:
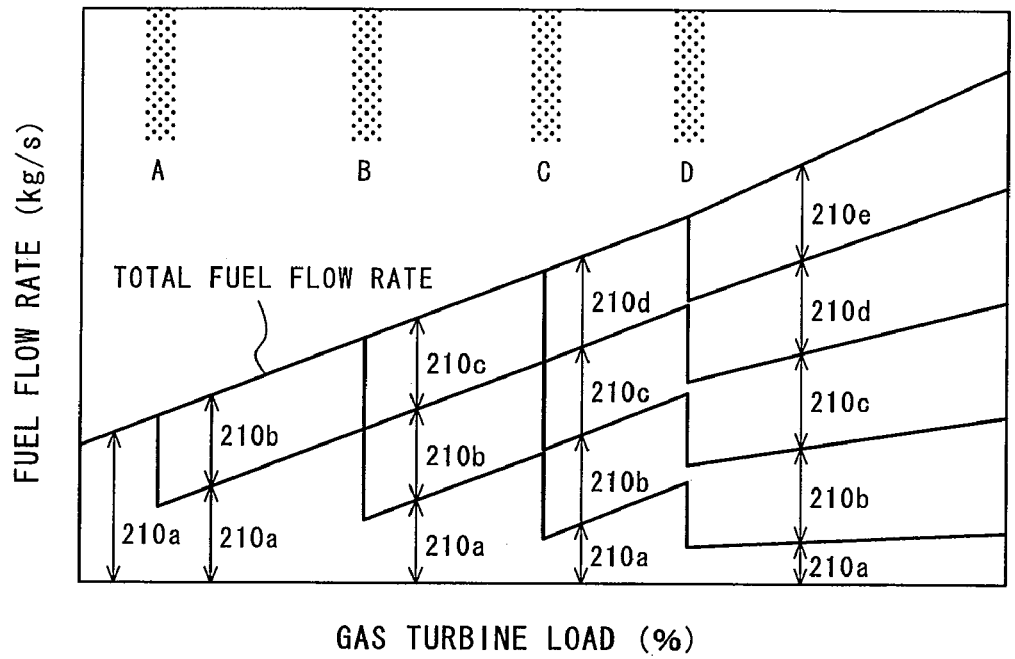
FIGS. 4A and 4B show changes in the flow rate of LNG and off gas under changing gas turbine loads according to the second embodiment of the present invention.
Figure 4B:
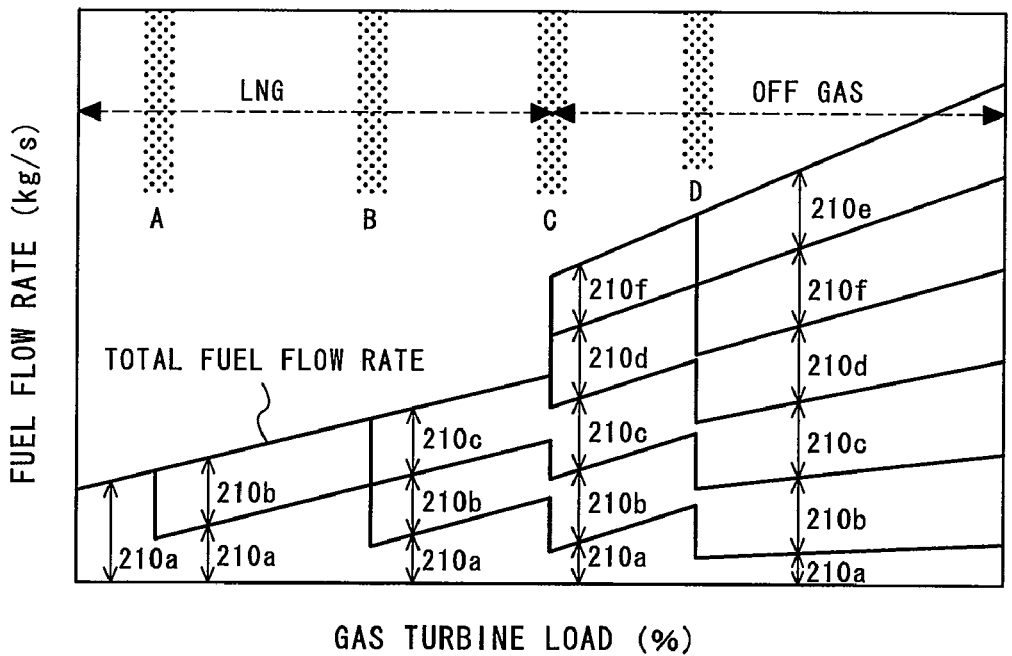

FIGS. 4A and 4B show changes in the fuel flow rate according to the second embodiment of the present invention. FIG. 4A shows changes in the fuel flow rate when the gas turbine is operated from ignition to full load only with the LNG. When the LNG only is used, the off gas-exclusive subsystem 210f is not used and the fuel flow rate follows the same pattern of changes as in FIG. 2A. Details will therefore be omitted.

FIG. 4B shows a relationship (load operation using the off gas) between the gas turbine load and the fuel flow rate in the second embodiment of the present invention. The gas turbine is operated with the LNG until the condition of gas turbine load C is reached and the gaseous fuel supply subsystems 210a, 210b, 210c are used to adjust the fuel flow rate according to load. Thereafter, the three-way transfer valve is operated to supply the gaseous fuel supply subsystems 210a to 210c with the off gas and the gaseous fuel supply subsystem 210d and the off gas-exclusive subsystem 210f are purged with nitrogen. After the purging, the flow rate of the off gas supplied to the gaseous fuel supply subsystem 210d and the off gas-exclusive subsystem 210f is increased to complete the change of fuel type. Fuel is thereafter supplied through the gaseous fuel supply subsystem 210e under the condition of gas turbine load D, so that the combustor can perform high load operations with low NOx combustion through all burner combustion. Understandably, purging must be performed before supplying the gaseous fuel supply subsystem 210e with fuel. The off gas-exclusive subsystem 210f included in the gas turbine according to the second embodiment of the present invention eliminates the likelihood of a significant increase in the pressure loss of the fuel nozzle in the gaseous fuel supply subsystem 210a in particular, that is, a subsystem that is shared by the LNG except the off gas-exclusive subsystem 210f.

[Third Embodiment]

Figure 5:
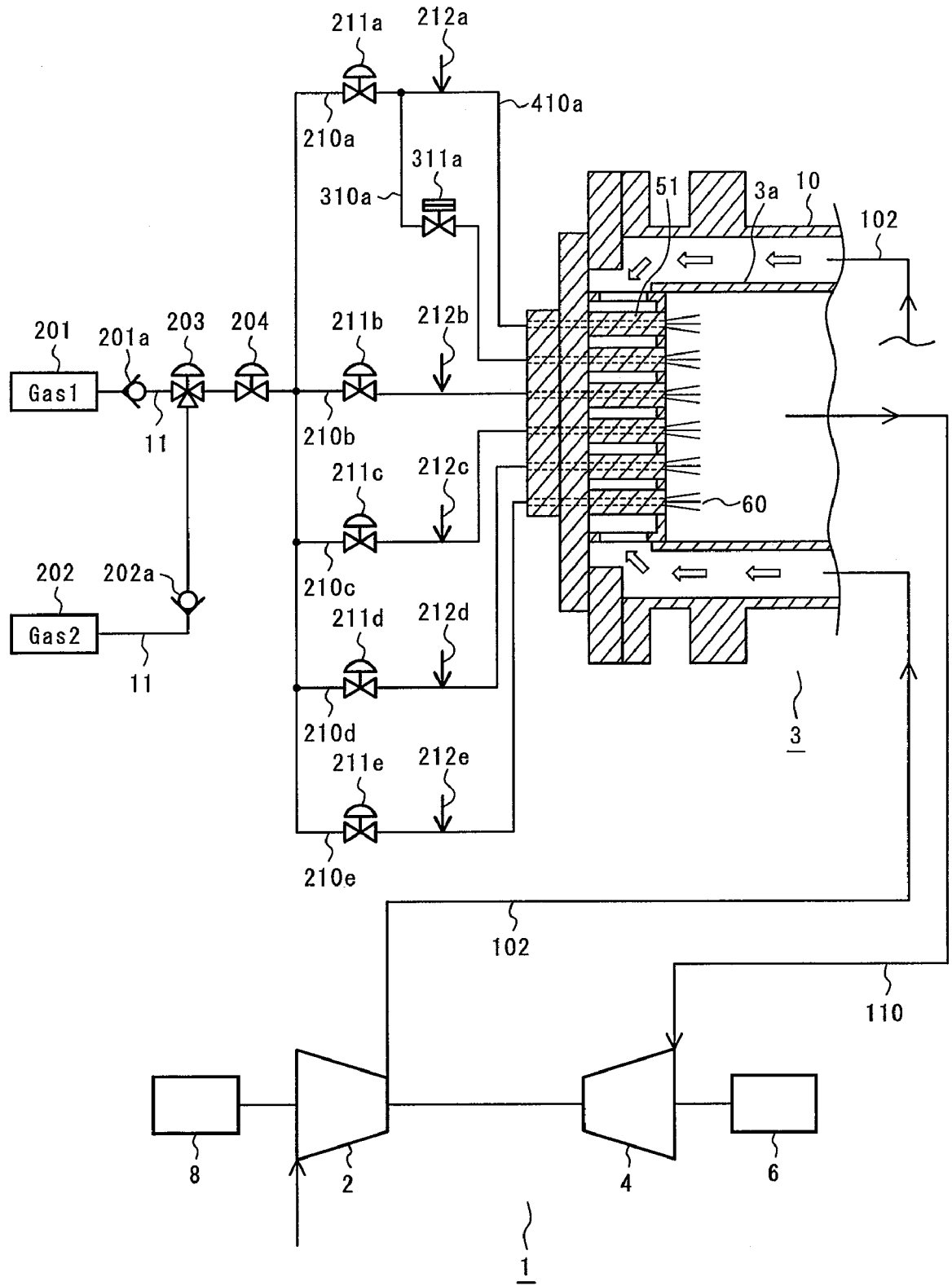
FIG. 5 is a schematic system diagram of a power plant according to a third embodiment of the present invention.

FIG. 5 is a schematic system diagram of a gas turbine power plant according to a third embodiment of the present invention. The third embodiment differs from the first embodiment in that a fuel subsystem leading to a pilot burner is formed by having a gaseous fuel supply subsystem 210a branching into two smaller subsystems. Specifically, the gaseous fuel supply subsystem 210a is branched into a first branch 410a and a second branch 310a at a point downstream thereof. The second branch 310a includes a gas shutoff valve 311a disposed therein. The gas shutoff valve 311a opens or closes according to the type of fuel and the gas turbine load. A pilot burner according to the third embodiment of the present invention has a larger gas hole area than the pilot burner in the second embodiment of the present invention. It is thereby assumed that the gas hole area of the fuel nozzle is adjusted such that the fuel pressure ratio of the fuel nozzle fall within the appropriate value range when the off gas is supplied.

Figure 6A:
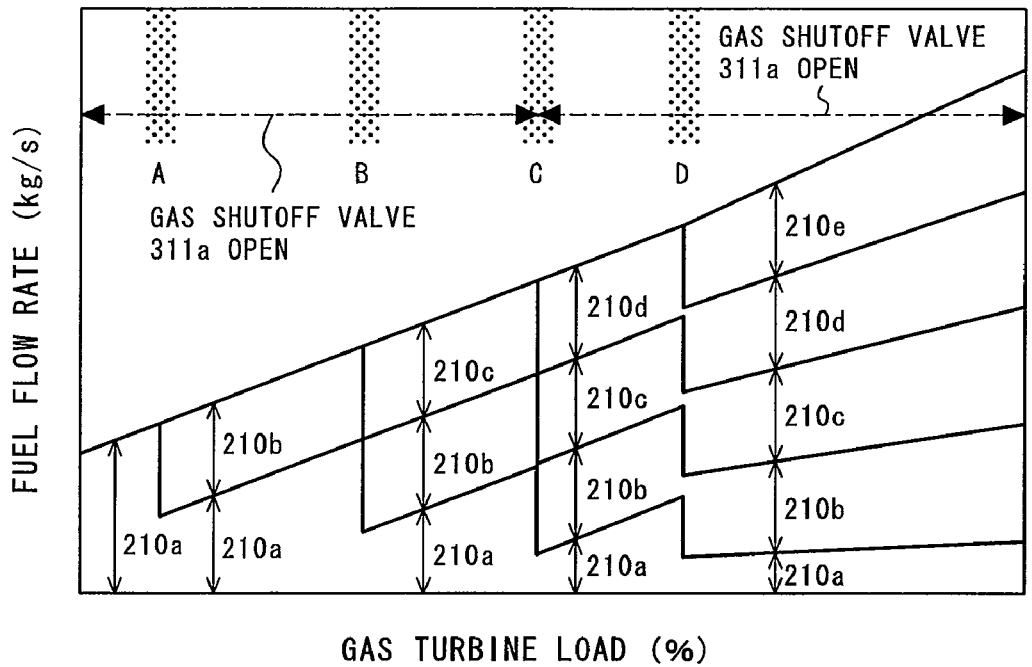
FIGS. 6A and 6B show changes in the flow rate of LNG and off gas under changing gas turbine loads according to the third embodiment of the present invention.
Figure 6B:
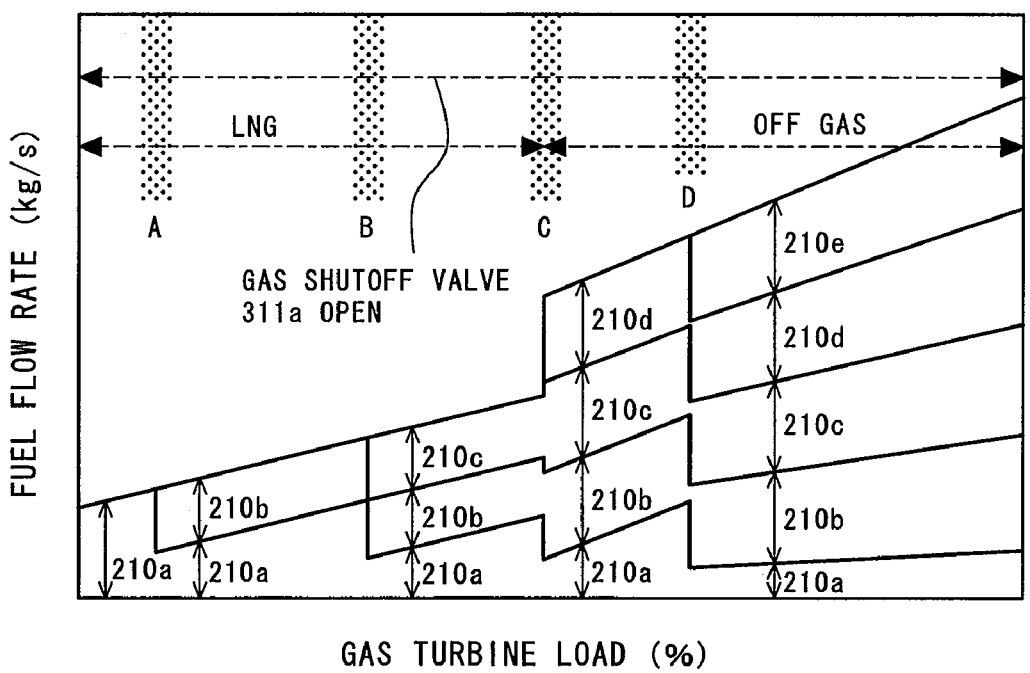

FIGS. 6A and 6B show a relationship between the gas turbine load and the fuel flow rate according to the third embodiment of the present invention. FIG. 6A shows changes in the fuel flow rate under changing loads from 0% load to 100% load in LNG operation. The gaseous fuel supply subsystem 210a is branched into the first branch 410a and the second branch 310a and the gas turbine is operated with the gas shutoff valve 311a open under conditions of gas turbine loads A and B. The fuel flow rate of the gaseous fuel supply subsystem 210a becomes small after a condition of gas turbine load C is reached. The gas turbine is therefore operated by supplying gaseous fuel supply subsystems 210b to 210d with fuel and closing the gas shutoff valve 311a. The foregoing operation allows a predetermined fuel pressure ratio of the fuel nozzle to be obtained even under a low flow rate condition of the gaseous fuel supply subsystem 210a as in a condition of gas turbine load C or D. In this case, the gas hole area of the fuel nozzle communicating with the gaseous fuel supply subsystem 210a is made larger than in the first and second embodiments. The same fuel flow rate control method as that described earlier applies under high load conditions higher than gas turbine load C.

FIG. 6B shows changes in the fuel flow rate when the off gas is supplied. In single fuel combustion of the LNG, the gas shutoff valve 311a for the gaseous fuel is closed in a range of gas turbine load C to 100% load, in which the fuel flow rate in the gaseous fuel supply subsystem 210a becomes small. With the off gas, the fuel flow rate becomes greater as compared with the LNG and a predetermined fuel pressure ratio in the fuel nozzle can be obtained even in operations with the gas shutoff valve 311a opened. Specifically, the gas turbine is operated with the gas shutoff valve 311a closed only in the range of the gas turbine load C to 100% load in the single fuel combustion of the LNG. In any other gas turbine load and fuel type conditions, the gas turbine is operated with the gas shutoff valve 311a open. Through the foregoing operations, an appropriate pressure for the fuel nozzle can be achieved for either type of the gaseous fuel, enabling low NOx operations.

What is claimed is:

1. A combustor comprising:
   two upstream parts of fuel supply system for supplying gaseous fuels of two types having different heating values from each other;
   a three-way fuel transfer valve for merging the two upstream parts of fuel supply system with each other;
   a plurality of gaseous fuel supply subsystems for supplying a combustion chamber with the gaseous fuels supplied through the three-way fuel transfer valve;
   a plurality of burners for injecting, corresponding to each of the gaseous fuel supply subsystems, the gaseous fuel supplied from the gaseous fuel supply subsystem into the combustion chamber; and
   a low Btu gas-exclusive subsystem disposed in parallel with the gaseous fuel supply subsystems, wherein:
   the low Btu gas-exclusive subsystem includes:
   a gaseous fuel flow control valve for adjusting the flow rate of the low Btu gas;
   a gas shutoff valve disposed upstream of the gaseous fuel flow control valve; and
   a purge subsystem disposed downstream of the gaseous fuel flow control valve.

2. The combustor according to claim 1, wherein:
   one of the gaseous fuels is liquefied natural gas (LNG) and the other of the gaseous fuels is an off gas having a lower heating value than the LNG, a coke oven gas generated during steel production processes, or other mixed gas containing hydrogen or carbon monoxide.

3. A combustor comprising:
   two upstream parts of fuel supply system for supplying gaseous fuels of two types having different heating values from each other;
   a three-way fuel transfer valve for merging the two upstream parts of fuel supply system with each other;
   a gaseous fuel pressure regulation valve for regulating pressure of the gaseous fuels supplied through the three-way fuel transfer valve;
   a plurality of gaseous fuel supply subsystems for supplying a combustion chamber with the gaseous fuels supplied through the gaseous fuel pressure regulation valve;
   a gaseous fuel flow control valve disposed in each of the gaseous fuel supply subsystems, the gaseous fuel flow control valve being adapted to adjust a gaseous fuel flow rate; and
   a plurality of burners for injecting, corresponding to each of the gaseous fuel supply subsystems, the gaseous fuel supplied from the gaseous fuel supply subsystem into the combustion chamber, wherein:
   one of the plurality of gaseous fuel supply subsystems includes branches branched downstream of the gaseous fuel flow control valve and a gas shutoff valve disposed in the branches.

\* \* \* \* \*